UNITED STATES PATENT OFFICE.

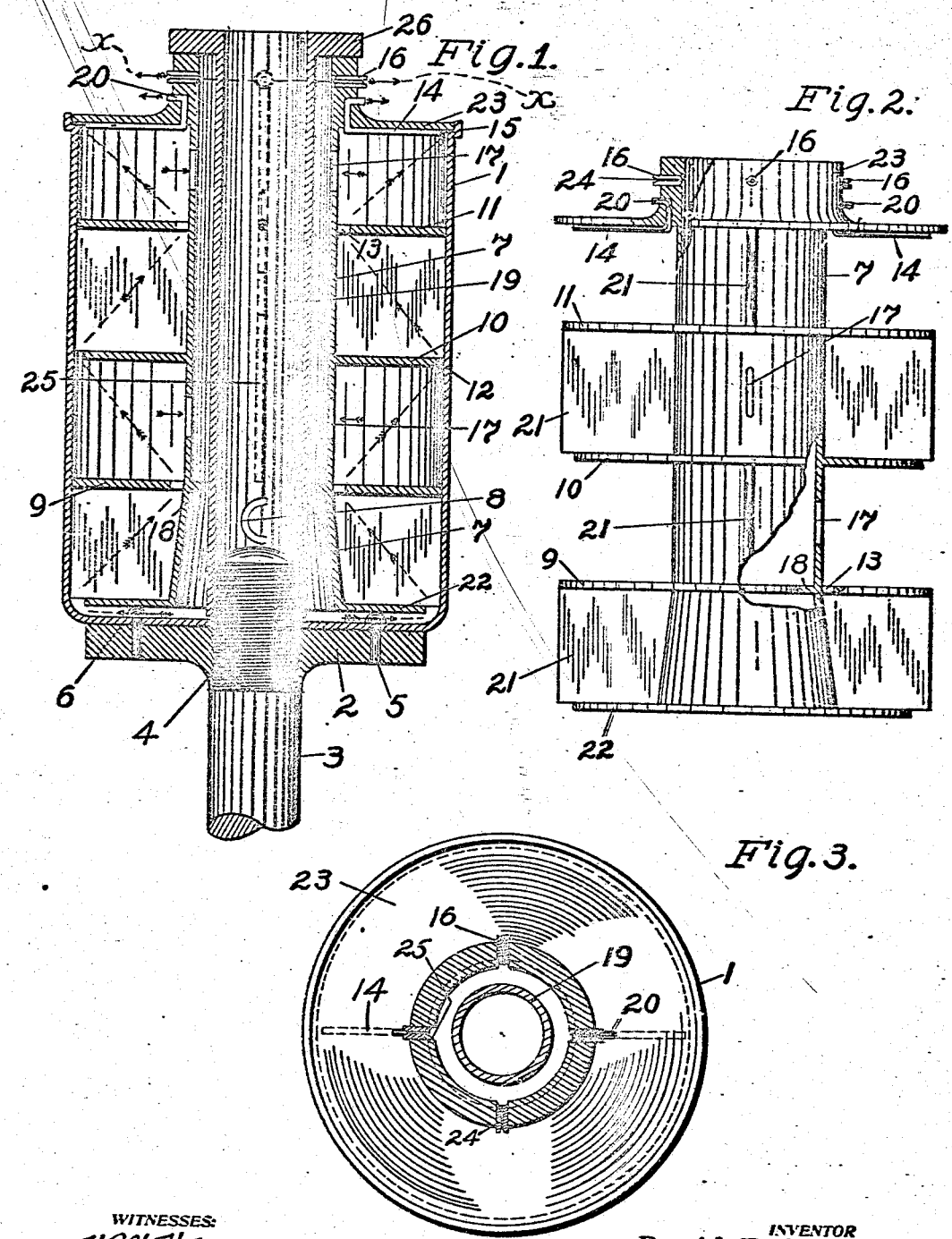

DAVID R. GREEN, OF WATERLOO, IOWA.

LINER FOR CENTRIFUGAL CREAM-SEPARATORS.

No. 895,010.  Specification of Letters Patent.  Patented Aug. 4, 1908.

Application filed August 19, 1907. Serial No. 389,232.

*To all whom it may concern:*

Be it known that I, DAVID R. GREEN, a citizen of the United States of America, and a resident of Waterloo, Blackhawk county, Iowa, have invented certain new and useful Improvements in Liners for Centrifugal Cream-Separators, of which the following is a specification.

My invention relates to improvements in centrifugal cream separators, and the object of my improvement is to furnish a liner with separating devices adapted to cause the separating milk to circulate thereover toward and from the cream zone to the inner periphery of the bowl and supplied with suitable means for imparting to the entering milk some of the rotatory motion of the bowl to move therewith. This object I have accomplished by the means which are hereinafter described and claimed, and which are illustrated in the accompanying drawings, in which:—

Figure 1 is a central vertical axial section of a centrifugal cream separator bowl with my improved lining and separating device inclosed therein. Fig. 2 is a detail side elevation of said lining and separating device. Fig. 3 is a horizontal section of said bowl taken through the neck of its cover on a line X X in Fig. 1.

Similar numbers refer to similar parts throughout the several views.

My improved lining-device is contained within a bowl 1, the latter connected by rivets 5 to a cast base-plate 2, said bowl and base-plate both having registering central orifices, interiorly threaded, to receive the exteriorly threaded upper end 4 of the spindle 3, the upper end of 4 projecting a short distance into said bowl above its bottom surface.

The bowl is provided with a cover 23 whose edge fits into the channeled upper edge of the bowl, said cover being secured *in situ* by means of a hollow clamping-bolt 19, engaging said cover by its contacting fillet 26 and whose lower end is interiorly threaded to screw upon the projecting upper end of the screw 4. Said tube 19 also serves as a milk-inlet, one or more outlets 8 being provided in the lower part thereof.

Integral with the cover 23 and projecting downward below it is a tube 7, of considerably greater diameter than the tube 19, and concentric therewith and spaced away therefrom. A ring 18 extends inwardly from the lower inner part of the tube 7 to contact with the outer surface of the tube 19, and prevent the milk from moving upward in the interspace above said ring between the tubes. Below said ring 18 the outer tube 7 is gradually expanded to form a frustum, whose lower end is united to a flat horizontal annulus 22 of slightly less outside diameter than the diameter of the inside of the bowl, to permit of the milk passing about it. The said annulus 22 is spaced away from the bottom of the bowl by resting upon the bossy heads of the rivets 5.

Projecting radially outward from the outside of the tube 7 are wings 21, spaced vertically apart, other radial wings 21 occupying the zones of said spaces but set at right angles to the plane of the first mentioned series of wings. The horizontal annuli 9, 10, and 11 are secured between the said wings, such annuli being parallel to the annulus 22, the annuli being spaced equally apart from each other and from the annulus 22 on one end and the cover of the bowl 23 at the other end of said bowl. The outer ends of the wings 21 are extended radially far enough to contact with the inner periphery of the bowl, but the horizontal annuli are of two diameters, the annuli 9 and 11 being of sufficient diameter to have their outer edges in contact with the inner periphery of said bowl, but the annulus 10 being spaced away therefrom to leave an annular space about its edge for the ascending milk to pass through. The inner edge of the annulus 10 is integral with the tube 7, but the annuli 9 and 11 are arranged with their inner edges spaced away from said tube, so as to leave annular channels for the passage of the separating milk.

Orifices 17 are placed in the tube 7 between the respective annuli 9, 10 and 11, and grooves 25 on the inner surface of said tube extend upward to communicate with and deliver into the radially adjustable cream-exit screws 16, the latter movable in tubular openings in the cover 23. Said screws may be adjusted radially so that their inner ends may project a desired distance within the grooves 25, to vary the degree of dilution of skimming of the cream. The milk - exit tubes 14 deliver through the cover 23 as shown, their inner receiving ends being located near the inner periphery of the upper edge of the bowl.

The device is assembled by first inserting the tube 7 in the bowl, and then inserting the tube 19, and securing it in place with the cover 23 thereby clamped tightly to the outer channeled edge of said bowl, the cream-screws having been adjusted radially as desired to effect the proper dilution of the delivered cream.

Milk ejaculated through the orifices 8 in the tube 19, passes under the ring 18 and downward between said tube and the tube 7, and below the annulus outwardly, then upward and inward about the outer edge of said annulus. The milk then passes upward, moving radially in and outward so as to move through the spaces successively between the annuli, the separated cream constantly seeking the orifices 17, thence rising in the grooves 25 to the cream-exit tubes 16. The stripping of the cream from the full milk is thus perfected, since the movement of the cream is hastened when it is carried inwardly with the current of milk in those interspaces where the current has to seek the inner annular channels between the annuli 9 and 11. The wings 21 are useful and effective in baffling the milk while undergoing separation, and especially in confining it so that the rotatory motion of the bowl and liner are imparted to it, preventing it from being held back by reason of its inertia, the bowl meanwhile moving about it. In other words, the said wings carry with them the milk, permitting it to only move along its predetermined course within the liner to the exits.

Having described my invention, what I claim as new, and desire to secure by Letters Patent, is:—

1. In a centrifugal cream separator, in combination, a bowl provided with a central axial milk inlet-tube provided with a discharge-opening and having milk- and cream-outlets, and a liner in said bowl composed of a vertical series of transverse annuli spaced apart extending from said inlet-tube to contact with and be sealed against the inner periphery of the bowl, such annuli having channels therethrough placed alternately adjacent to such inlet-tube and to the inner periphery of the bowl and adapted to cause the separating milk to flow therethrough in reversed directions toward and from the axis of the bowl, and vertical plates intersecting the interspaces between said annuli and extending from said inlet-tube to the inner periphery of the bowl.

2. In a centrifugal cream separator, in combination, a bowl having a milk-inlet-tube and having milk- and cream-exits, and a liner in said bowl composed of a cream-tube concentrically encircling and spaced away from said inlet-tube, transverse disks vertically spaced apart and disposed in alternate series, one series of disks having their outer edges spaced away from the inner surface of the bowl and their inner edges united to and sealed against said cream-tube, and the other alternating series having their outer edges contacting with and sealed against the inner surface of the bowl and their inner edges spaced away from said cream-tube, and radial baffling-plates extending from said cream-tube to the inner surface of the bowl and intersecting the interspaces between said transverse disks at an angle to the latter.

3. In a centrifugal cream separator, in combination, a bowl provided with a cover having milk- and radially-adjustable cream-exits, a milk-inlet tube having a discharging orifice and adapted to be removably secured with said cover to said bowl, a tube pendent from said cover concentrically encircling and spaced away from said inlet-tube, its lower end united to a base-disk of less diameter than the interior of said bowl and the latter spaced away from the bottom of the bowl, a closure-ring adapted to close the interspace between the inlet-tube and the cream-tube immediately above the discharge-opening of the former, radial wings extending from said pendent cream-tube to closely contact with the inner periphery of said bowl, annuli spaced apart in said bowl, every other annulus above said base-disk having its inner edge spaced away from the said outer tube and its outer edge in close contact with and sealed against the inner periphery of the bowl, and each intermediate annulus having its inner edge in contact with and sealed against said outer tube and its outer edge spaced away from the inner periphery of the bowl, said outer tube having channels therein communicating between the interspaces of the annuli and the adjustable cream-exits.

Signed at Waterloo, Iowa, this 30th day of July, 1907.

DAVID R. GREEN.

Witnesses:
O. D. YOUNG,
H. M. HARPER.